(12) United States Patent
Abdalla et al.

(10) Patent No.: US 9,527,013 B2
(45) Date of Patent: Dec. 27, 2016

(54) FLUIDIZING UNIT AND DISCHARGING SYSTEM

(71) Applicant: FMC Separation Systems, BV, Amsterdam (NL)

(72) Inventors: Tarig Mukthar Abdalla, Amsterdam (NL); Adekunle Olutayo Opawale, Arnhem (NL)

(73) Assignee: FMC Separation Systems BV, Amsterdam (NL)

( * ) Notice: Subject to any disclaimer, the term of this patent is extended or adjusted under 35 U.S.C. 154(b) by 0 days.

(21) Appl. No.: 14/889,829

(22) PCT Filed: May 6, 2013

(86) PCT No.: PCT/EP2013/059422
§ 371 (c)(1),
(2) Date: Nov. 6, 2015

(87) PCT Pub. No.: WO2014/180497
PCT Pub. Date: Nov. 13, 2014

(65) Prior Publication Data
US 2016/0101376 A1    Apr. 14, 2016

(51) Int. Cl.
*B65G 53/58* (2006.01)
*B01D 21/24* (2006.01)

(52) U.S. Cl.
CPC ........... *B01D 21/24* (2013.01); *B01D 21/2472* (2013.01)

(58) Field of Classification Search
CPC ...... B65G 53/30; B65G 53/58; B01D 21/2472

USPC .............................. 406/92, 136, 137; 138/45
See application file for complete search history.

(56) References Cited

U.S. PATENT DOCUMENTS

| | | | |
|---|---|---|---|
| 337,388 A | 3/1886 | Fernald et al. | |
| 2,430,278 A * | 11/1947 | Daniels .................. | B01D 45/10 406/108 |
| 3,451,724 A * | 6/1969 | Cappelli ................. | B60P 3/224 406/137 |
| 3,893,655 A * | 7/1975 | Sandiford ............. | B01F 3/1271 366/114 |
| 3,973,802 A * | 8/1976 | Kwon ..................... | B65G 53/58 406/92 |
| 4,097,092 A * | 6/1978 | Lapple .................... | B65G 53/58 406/194 |
| 4,265,572 A | 5/1981 | Bourdois et al. | |
| 4,300,749 A * | 11/1981 | Ferro .................... | F16K 1/2014 138/45 |

(Continued)

FOREIGN PATENT DOCUMENTS

| | | |
|---|---|---|
| EP | 0 802 135 A1 | 10/1997 |
| EP | 0 819 629 B1 | 5/2004 |
| WO | WO 96/05128 A1 | 2/1996 |

*Primary Examiner* — Joseph Dillon, Jr.

(57) ABSTRACT

The present invention provides a fluidizing unit (1) for use in a vessel desanding system, comprising a discharge pipe (2) and a supply duct (3), the discharge pipe comprises a discharge inlet (4) and a discharge outlet (5), and the supply duct is formed by a housing (6) arranged around the discharge pipe defining an annular space (7) between an outer surface of said pipe and an inner surface of the housing, the supply duct comprises a pressurized liquid inlet (8) and a pressurized liquid outlet (9), wherein the pressurized liquid outlet, during use, is able to provide a pressurized liquid flow having a substantially elliptic cross-section.

9 Claims, 4 Drawing Sheets

Section A-A

(56) References Cited

U.S. PATENT DOCUMENTS

| | | | | |
|---|---|---|---|---|
| 4,320,995 A * | 3/1982 | Tennes | B65G 53/30 406/106 |
| 4,354,624 A * | 10/1982 | Chowdhury | B05B 1/3006 111/120 |
| 4,693,826 A * | 9/1987 | Beck | B01D 21/02 210/512.1 |
| 4,721,126 A * | 1/1988 | Horii | B65G 53/58 137/1 |
| 4,952,099 A * | 8/1990 | Drobadenko | B65G 53/30 406/122 |
| 4,978,251 A | 12/1990 | Drobadenko et al. | |
| 5,002,092 A * | 3/1991 | Oirschot | B65G 53/50 137/891 |
| 5,853,266 A * | 12/1998 | Parkinson | B65G 53/30 406/142 |
| 5,879,541 A * | 3/1999 | Parkinson | B01D 21/2411 159/27.2 |
| 6,170,768 B1 * | 1/2001 | Harmon | B65G 53/14 241/39 |
| 8,371,323 B2 * | 2/2013 | Delves | B65D 90/626 137/1 |
| 8,834,074 B2 * | 9/2014 | Leininger | 406/194 |
| 8,968,481 B2 * | 3/2015 | Henderson | B08B 9/0321 134/22.1 |
| 2004/0197154 A1 * | 10/2004 | Krambrock | B65G 53/30 406/168 |
| 2005/0260043 A1 * | 11/2005 | Lange | B65G 53/30 406/136 |
| 2008/0219779 A1 * | 9/2008 | Parkinson | B65G 53/30 406/137 |
| 2009/0020467 A1 * | 1/2009 | Parkinson | B01D 17/0217 210/188 |
| 2012/0269586 A1 * | 10/2012 | Hamel | B65G 53/58 406/108 |
| 2016/0137431 A1 * | 5/2016 | Bizhanzadeh | B65G 53/14 406/48 |

* cited by examiner

Section A-A

Section B-B

Section C-C

Section D-D

Section E-E

Section G-G

FLUIDIZING UNIT AND DISCHARGING SYSTEM

FIELD OF THE INVENTION

The present invention concerns a fluidizing unit for use in a vessel desanding system, and a vessel desanding system comprising said unit.

BACKGROUND OF THE INVENTION

Solids production is a common phenomenon in the petroleum industry. Sand and other solid particles are usually produced to the surface production facilities with the oil, gas and water from the reservoir. This causes several operational problems, such as erosion of upstream equipment, clogging of flowlines and accumulation in the production vessels. Major consequences of these problems could be the reduction in performance of the separator internals and an unplanned shut down of the entire production operation. To avoid such problems, vessel desanding systems are commonly used. In all such systems an accumulation of solids occurs. To remove the solids from the desanding system, the accumulated solids are fluidized by the use of liquid, usually water, and discharged from the system. There are a number of different methods for fluidizing/discharging the solids. Known methods include:

The classic jetting system. The disadvantages of this system are excessive water consumption, large disturbances in process separators, low efficiency of sand removal and risk of clogging.

EP 0802135 A1 discloses a fluidizing unit for fluidizing a non-specified medium. A disadvantage of the disclosed unit is the limited range of operation and thus the quite low efficiency of sand removal.

The aim of the present invention is to provide a fluidizing unit for incorporation in vessel desanding systems which avoids or alleviates at least some of the disadvantages of the prior art techniques.

SUMMARY OF THE INVENTION

The present invention provides a fluidizing unit for efficient removal of accumulated solids/sand in a separator (desander), in particular a vessel desanding system. The unit requires a minimum amount of liquid just what is needed for fluidization, it can be operated in both online as well batch-wise modes, and it can be retrofitted into existing separator vessels as well as configured for new-built vessels. The invention is further defined in the attached claims, and in the following:

In one embodiment, the invention concerns a fluidizing unit for use in a desanding system. The unit comprises a discharge pipe and a supply duct. The discharge pipe comprises a discharge inlet and a discharge outlet, and the supply duct is formed by a housing arranged around the discharge pipe, thereby defining an annular space between an outer surface of said pipe and an inner surface of the housing. The supply duct comprises a pressurized liquid inlet and a pressurized liquid outlet, wherein the pressurized liquid outlet, during use, is able to provide a pressurized liquid flow having a substantially elliptic cross-section.

In some embodiments of a fluidizing unit according to the invention, the elliptic cross-section of the pressurized liquid flow is in a plane substantially perpendicular to a centerline of the discharge pipe.

In some embodiments of the fluidizing unit according to the invention, the housing is substantially shaped as a truncated cone having the pressurized liquid inlet arranged close to the larger base plane and the pressurized liquid outlet arranged at the smaller base plane.

In some embodiments of the fluidizing unit according to the invention, the pressurized liquid outlet comprises one end of the annular space, and said end has an elliptic cross-section in a plane substantially perpendicular to a centerline of the discharge pipe.

In some embodiments of the fluidizing unit according to the invention, the cross-section of the housing and the discharge pipe, in a plane substantially perpendicular to a centerline of the discharge pipe, is circular at the pressurized liquid inlet.

In some embodiments of the fluidizing unit according to the invention, the cross-section of the housing and the discharge pipe, in a plane substantially perpendicular to a centerline of the discharge pipe, is elliptic at the pressurized liquid outlet.

In some embodiments of the fluidizing unit according to the invention, the pressurized liquid outlet comprises an annular flange arranged close to the discharge inlet, such that pressurized liquid exiting the outlet during use is led in a direction substantially perpendicular to the centerline of the discharge pipe.

In some embodiments of the fluidizing unit according to the invention, the discharge inlet has an elliptic cross-section, the major axis of which is aligned with the major axis of the elliptic cross-section of the pressurized fluid outlet or the elliptic cross-section of the pressurized liquid flow.

In some embodiments of the fluidizing unit according to the invention, the pressurized liquid inlet is arranged such that pressurized liquid will enter off-center to the centerline of the discharge pipe during use, causing said liquid to swirl around said pipe.

The present invention also discloses a desanding system comprising a vessel and at least one fluidizing unit according to the invention, wherein said unit is arranged within the vessel such that the major axis of the elliptic cross-section of the pressurized liquid flow is aligned with the longitudinal axis of the bottom of the vessel. The pressurized liquid outlet and the discharge inlet are arranged close to the bottom of the vessel.

BRIEF DESCRIPTION OF THE DRAWINGS

An embodiment of the invention is depicted in the attached drawings.

DETAILED DESCRIPTION OF THE INVENTION

Figure 1:
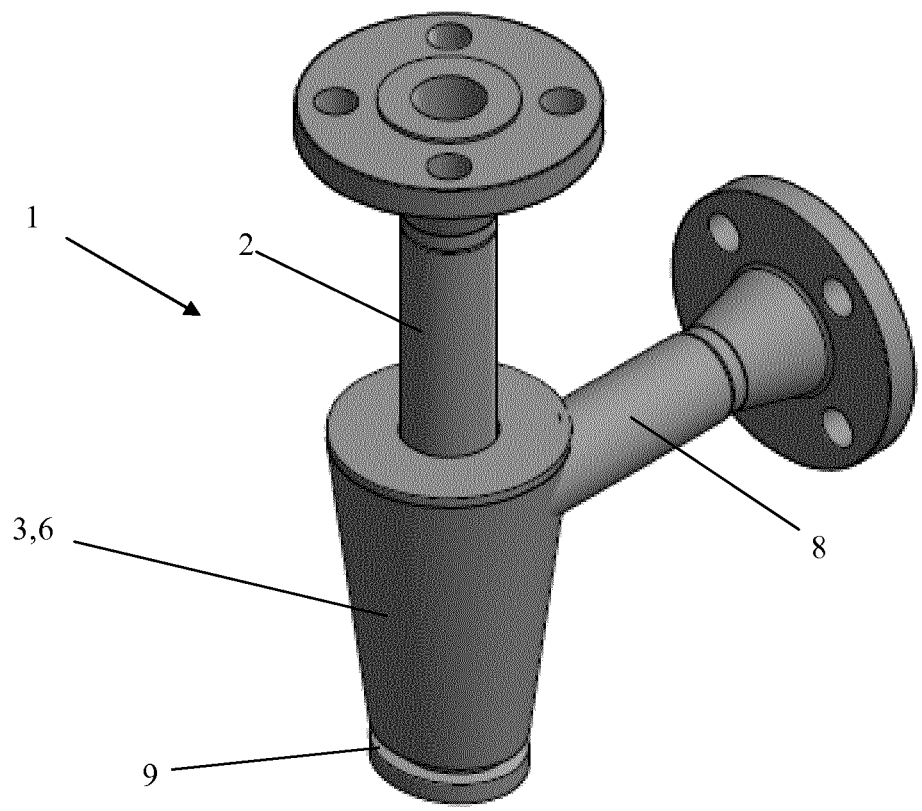
FIG. 1 is a perspective view of a fluidizing unit according to the invention.
Figure 2:
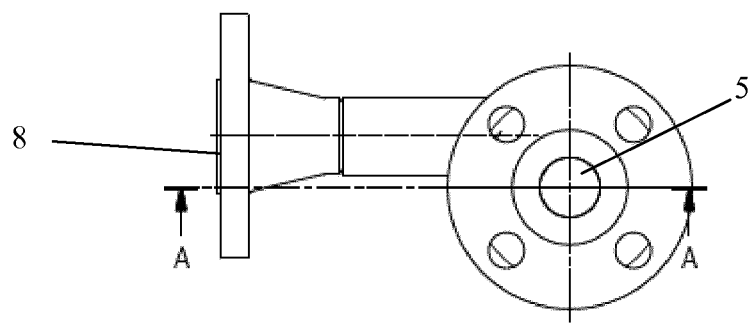
FIG. 2 is a top view of the fluidizing unit in FIG. 1.
Figure 3:
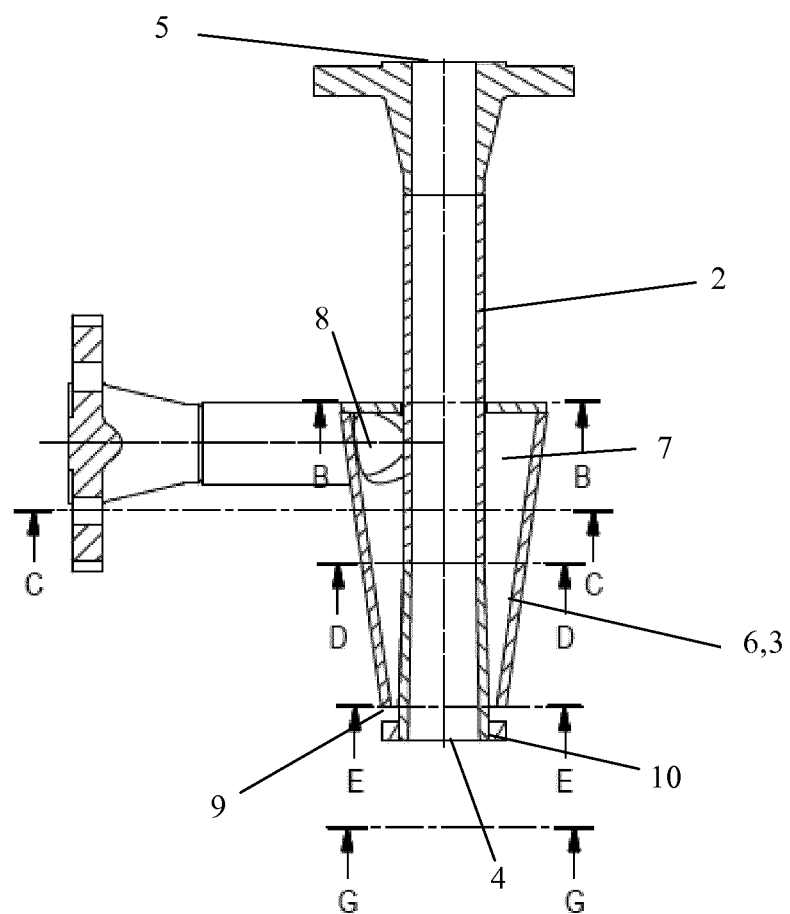
FIG. 3 is a cross-sectional view of the fluidizing unit in FIG. 1 taken along line A-A of FIG. 2.
Figure 4:
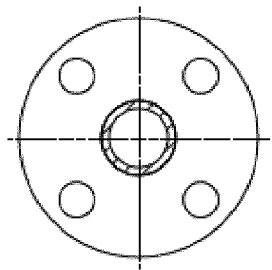
FIG. 4 is a cross-sectional view of the fluidizing unit in FIG. 1 taken along line B-B of FIG. 3.
Figure 5:
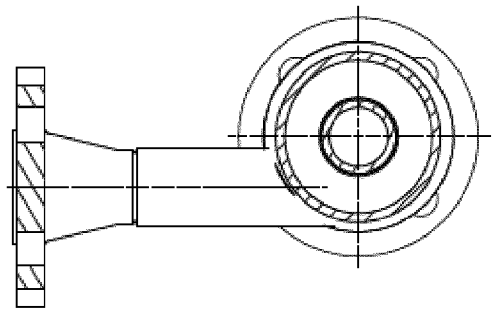
FIG. 5 is a cross-sectional view of the fluidizing unit in FIG. 1 taken along line C-C of FIG. 3.
Figure 6:
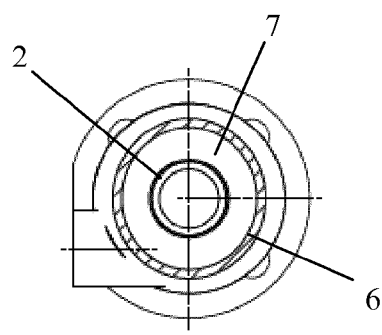
FIG. 6 is a cross-sectional view of the fluidizing unit in FIG. 1 taken along line D-D of FIG. 3.
Figure 7:
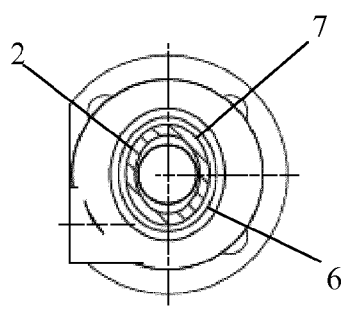
FIG. 7 is a cross-sectional view of the fluidizing unit in FIG. 1 taken along line E-E of FIG. 3.
Figure 8:
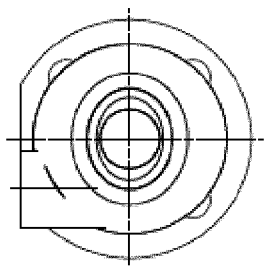
FIG. 8 is a cross-sectional view of the fluidizing unit in FIG. 1 taken along line G-G of FIG. 3.

An embodiment of a fluidizing unit according to the invention is shown in FIG. 1. The unit 1 is intended to be incorporated into a vessel desanding system for removing accumulated solids/sand. The unit may be operated in an online desanding mode or in a batch sand removal operation during routine maintenance. The unit comprises a discharge pipe 2 for removal of the fluidized solids. The slurry comprising fluidized solids is sucked into the discharge inlet 4 and removed through the discharge outlet 5. The solids are fluidized by the use of pressurized liquid, usually water. The liquid is introduced into the supply duct 3 through the inlet 8. The supply duct 3 comprises a housing 6 arranged around the discharge pipe 2. The inner surface of the housing and an outer surface of the discharge pipe define an annular space 7 between them. The cross-section of the annular space, in a plane substantially perpendicular to the centerline of the discharge pipe, is circular at the pressurized liquid inlet 8 and elliptic at the pressurized fluid outlet (see FIGS. 6 and 7). The inlet 8 is arranged distal to the outlet 9 of the supply duct and is oriented off-center to said duct (see FIG. 5), such that the liquid is caused to swirl around the central discharge pipe. The pressurized liquid exits the outlet 9 as a liquid flow having an elliptic cross-section in a plane substantially perpendicular to the centerline of the discharge pipe. In this embodiment the liquid flow is directed substantially perpendicular to the centerline of the discharge pipe by a flange 10. The flange is arranged close to the discharge inlet 4. The cross-section of the discharge inlet 4, in a plane substantially perpendicular to the centerline of the discharge pipe, is also elliptic to provide an optimal discharge profile. The elliptic shape of the exiting liquid flow provides a wider fluidization zone compared to the one obtained with a circular cross-section at the outlet.

Figure 9:
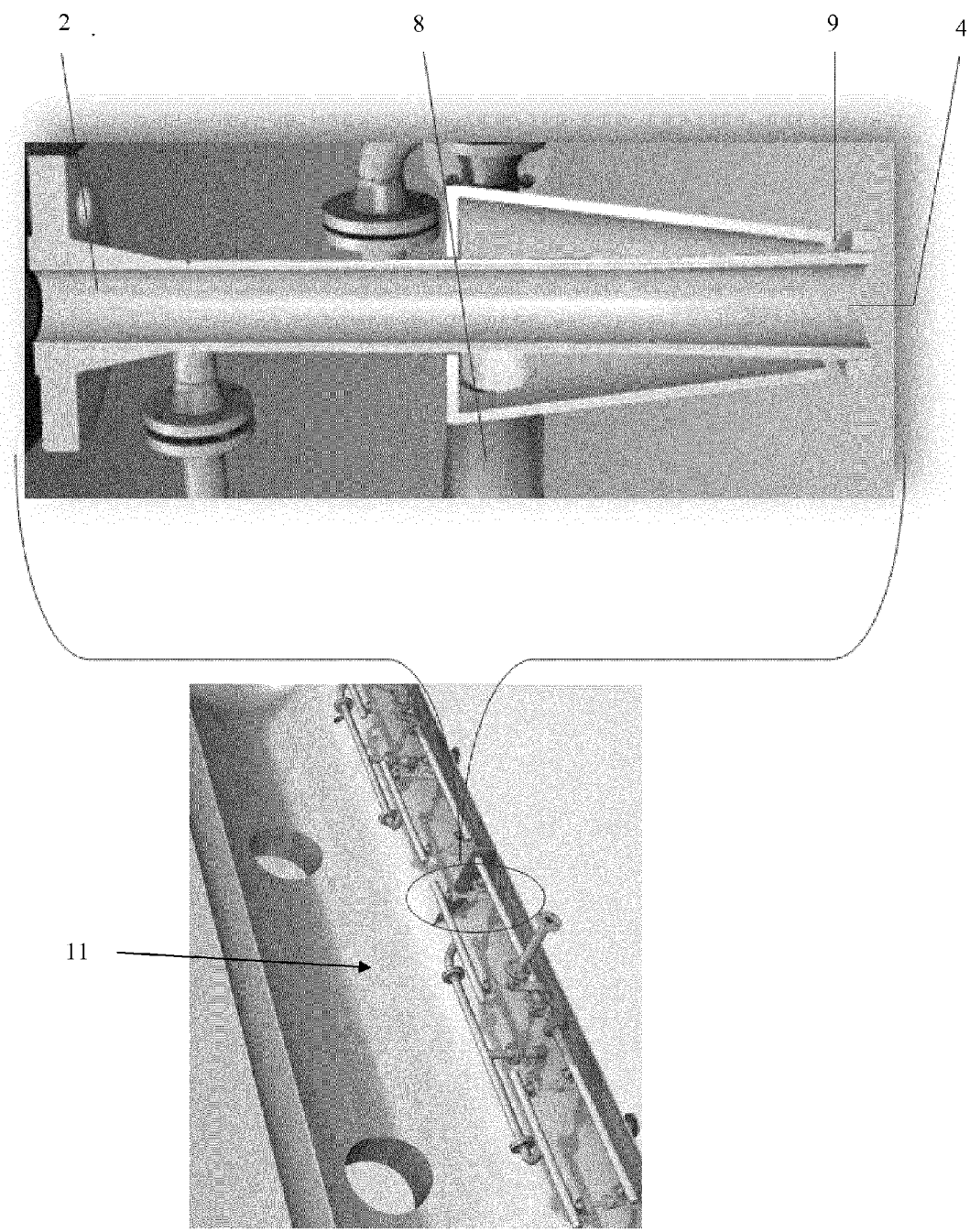
FIG. 9 shows multiple fluidizing units of the present invention arranged in a Single Vessel Desanding System (SVDS).

Referring to FIG. 9, the fluidizing unit of the present invention is for incorporation into a vessel desander system 11. The desander system comprises a vertical or horizontal vessel, wherein solids/sand will accumulate at the bottom due to gravity. In the present system several fluidizing units are arranged inside the vessel. The outlets of the units are further arranged close to the bottom of the vessel, such that the major axis of the exiting pressurized elliptic fluid flow and/or the major axis of the elliptic cross-section of the pressurized liquid outlet are aligned with the longitudinal axis of the bottom. This arrangement ensures an optimal fluidization of accumulated solids/sand using a minimum amount of water, as well as minimizing any disturbances in the separator.

The invention claimed is:

1. A fluidizing unit for use in a vessel desanding system comprising:
    a discharge pipe which comprises a discharge inlet and a discharge outlet; and
    a supply duct which is formed by a housing arranged around the discharge pipe to thereby define an annular space between an outer surface of said discharge pipe and an inner surface of the housing, the supply duct comprising a pressurized liquid inlet and a pressurized liquid outlet;
    wherein the pressurized liquid outlet comprises one end of the annular space, said end having an elliptic cross-section in a plane substantially perpendicular to a centerline of the discharge pipe, such that the pressurized liquid outlet provides a pressurized liquid flow having an elliptic cross-section.

2. A fluidizing unit according to claim 1, wherein the elliptic cross-section of the pressurized liquid flow is in a plane substantially perpendicular to the centerline of the discharge pipe.

3. A fluidizing unit according to claim 1, wherein the housing is substantially shaped as a truncated cone, and wherein the pressurized liquid inlet is arranged adjacent a larger base plane of the cone and the pressurized liquid outlet is arranged adjacent a smaller base plane of the cone.

4. A fluidizing unit according to claim 3, wherein a cross-section of the housing and of the discharge pipe in a plane substantially perpendicular to a centerline of the discharge pipe is circular at the pressurized liquid inlet.

5. A fluidizing unit according to claim 4, wherein a cross-section of the housing and of the discharge pipe in a plane substantially perpendicular to a centerline of the discharge pipe is elliptic at the pressurized liquid outlet.

6. A fluidizing unit according to claim 5, wherein the pressurized liquid outlet comprises an annular flange arranged proximate the discharge inlet such that pressurized liquid exiting the pressurized liquid outlet is directed substantially perpendicular to the centerline of the discharge pipe.

7. A fluidizing unit according to claim 6, wherein the discharge inlet has an elliptic cross-section, the major axis of which is aligned with a major axis of the elliptic cross-section of the pressurized fluid outlet.

8. A fluidizing unit according to any of the preceding claim 7, wherein the pressurized liquid inlet is configured such that pressurized liquid enters the supply duct off-center relative to the centerline of the discharge pipe, thereby causing said liquid to swirl around said pipe.

9. A vessel desanding system comprising:
    a vessel; and
    at least one fluidizing unit which includes:
        a discharge pipe which comprises a discharge inlet and a discharge outlet; and
        a supply duct which is formed by a housing arranged around the discharge pipe to thereby define an annular space between an outer surface of said discharge and an inner surface of the housing, the supply duct comprising a pressurized liquid inlet and a pressurized liquid outlet;
    wherein the pressurized liquid outlet comprises one end of the annular space, said end having an elliptic cross-section in a plane substantially perpendicular to a centerline of the discharge pipe such that the pressurized liquid outlet provides a pressurized liquid flow having an elliptic cross-section;
    wherein said fluidizing unit is arranged within the vessel such that the pressurized fluid outlet is proximate a bottom of the vessel and the major axis of the elliptic cross-section of the pressurized liquid flow is aligned with a longitudinal axis of said bottom.

* * * * *